United States Patent
Kusabe et al.

(10) Patent No.: US 12,497,023 B2
(45) Date of Patent: Dec. 16, 2025

(54) CONTROL DEVICE OF VEHICLE DRIVE DEVICE

(71) Applicant: AISIN CORPORATION, Aichi (JP)

(72) Inventors: Keiichirou Kusabe, Kariya (JP); Kohei Tsuda, Kariya (JP); Bumpei Nakaya, Kariya (JP)

(73) Assignee: AISIN CORPORATION, Kariya (JP)

( * ) Notice: Subject to any disclaimer, the term of this patent is extended or adjusted under 35 U.S.C. 154(b) by 420 days.

(21) Appl. No.: 18/034,250

(22) PCT Filed: Jan. 20, 2022

(86) PCT No.: PCT/JP2022/001978
§ 371 (c)(1),
(2) Date: Apr. 27, 2023

(87) PCT Pub. No.: WO2022/158523
PCT Pub. Date: Jul. 28, 2022

(65) Prior Publication Data
US 2023/0391316 A1    Dec. 7, 2023

(30) Foreign Application Priority Data
Jan. 20, 2021 (JP) .............................. 2021-007378

(51) Int. Cl.
*B60W 20/40* (2016.01)
(52) U.S. Cl.
CPC ..... *B60W 20/40* (2013.01); *B60W 2510/0657* (2013.01); *B60W 2510/083* (2013.01)

(58) Field of Classification Search
None
See application file for complete search history.

(56) References Cited

U.S. PATENT DOCUMENTS

| | | | |
|---|---|---|---|
| 6,549,840 B1 * | 4/2003 | Mikami | B60K 6/365 903/910 |
| 9,026,291 B2 * | 5/2015 | Hayashi | B60W 20/00 701/22 |

(Continued)

FOREIGN PATENT DOCUMENTS

JP    2005-176481 A    6/2005

*Primary Examiner* — Redhwan K Mawari
(74) *Attorney, Agent, or Firm* — Oliff PLC

(57) ABSTRACT

A distribution differential gear mechanism includes a first rotation element drivingly connected to input member, a second rotation element drivingly connected to output member, and a third rotation element drivingly connected to rotary electric machine. When rotation speed difference between rotation speed of the second and first rotation elements become equal to or less than synchronization threshold due to an increase in rotation speed of output member, control device executes synchronization maintaining control of maintaining rotation speed difference at specified difference rotation that is set to be equal to or less than synchronization threshold, by performing a rotation speed control of rotary electric machine in conjunction with rotation speed of second rotation element and by causing internal combustion engine to output a target torque, and control device executes engagement control of transitioning second engagement device from released state to engagement state while synchronization maintaining control is being executed.

12 Claims, 6 Drawing Sheets

(56) References Cited

U.S. PATENT DOCUMENTS

| | | | |
|---|---|---|---|
| 2009/0221194 A1* | 9/2009 | Suzuki | B63H 20/14 440/86 |
| 2009/0299613 A1* | 12/2009 | Nishi | B60W 10/06 701/110 |
| 2011/0021310 A1* | 1/2011 | Kresse | B60L 50/16 180/65.265 |
| 2014/0235405 A1* | 8/2014 | Mori | F16H 63/502 477/77 |
| 2014/0303822 A1* | 10/2014 | Kawamura | B60W 20/40 180/65.265 |
| 2015/0314778 A1* | 11/2015 | Matsui | B60L 50/16 180/65.265 |
| 2018/0073593 A1* | 3/2018 | Kawamura | F16F 15/13121 |

* cited by examiner

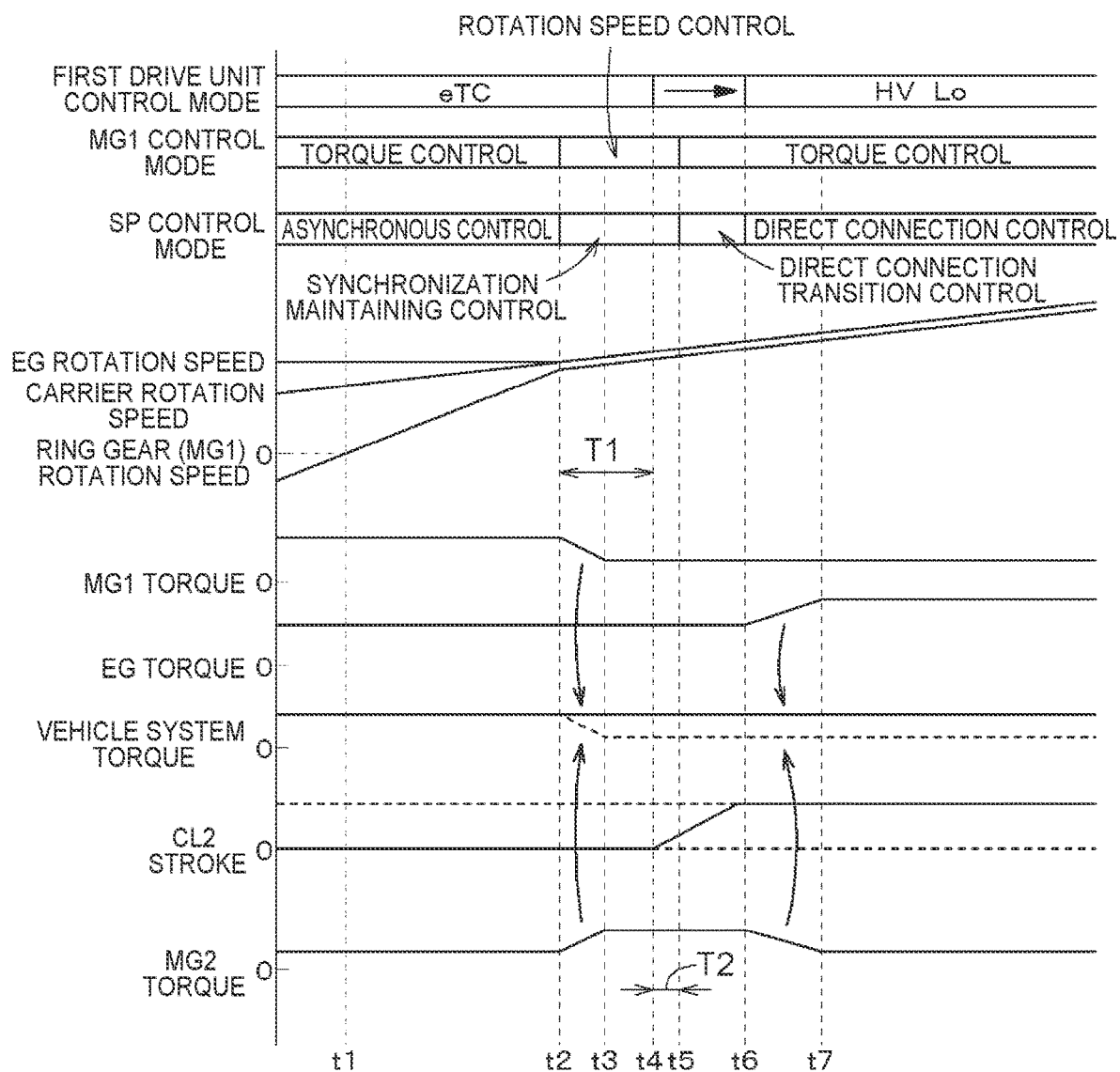

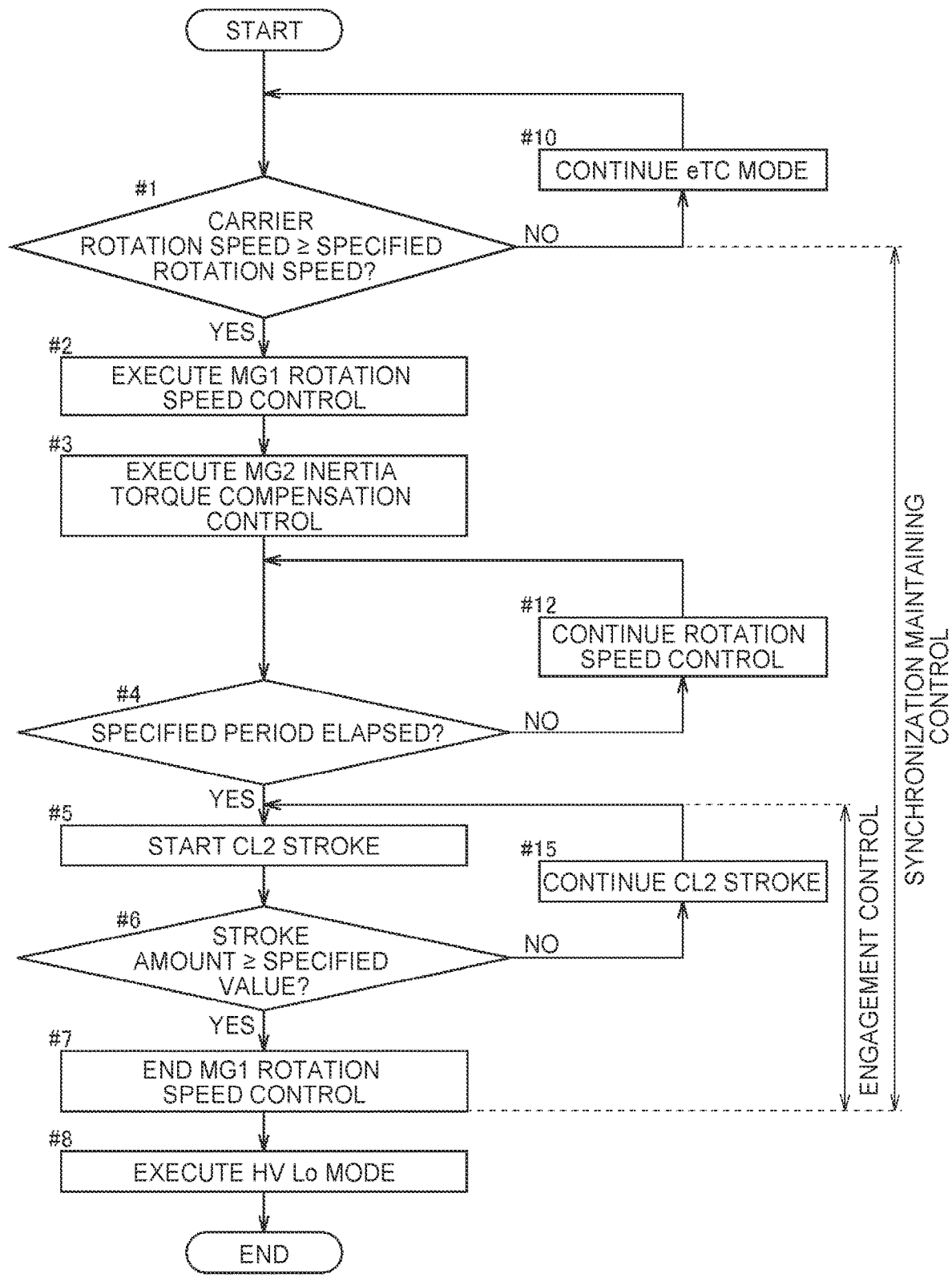

CONTROL DEVICE OF VEHICLE DRIVE DEVICE

TECHNICAL FIELD

The present disclosure relates to a vehicle drive device that includes: an input member drivingly connected to an internal combustion engine; an output member drivingly connected to a wheel; a rotary electric machine; a distribution differential gear mechanism in which each of the plurality of rotation elements is drivingly connected to the input member and the rotary electric machine; a transmission mechanism that performs power transmission between the distribution differential gear mechanism and the output member; a first engagement device that connects and disconnects power transmission between the input member and the distribution differential gear mechanism; and a second engagement device that connects and disconnects power transmission between two selected from a plurality of rotation elements of the distribution differential gear mechanism.

BACKGROUND ART

In the vehicle drive device as described above, there is a vehicle drive device that can select: an electric torque converter mode (eTC mode) in which the first engagement device is in an engagement state, the second engagement device is in a released state, a torque of an internal combustion engine is amplified with a torque of a rotary electric machine serving as a reaction force and the amplified torque is transmitted to an output member side by the distribution differential gear mechanism, and a vehicle is caused to travel; and a hybrid mode in which the first engagement device and the second engagement device are in the engagement state, and the torque of the internal combustion engine and the rotary electric machine are transmitted to the output member. Japanese Patent Application Publication No. 2005-176481 (JP 2005-176481 A) discloses such a vehicle drive device. In this vehicle drive device, in a case of transitioning from an eTC mode to a hybrid mode, when a rotation speed of a rotary electric machine matches or substantially matches a rotation speed of an internal combustion engine maintained at a target rotation speed, a clutch corresponding to a second engagement device is engaged, and the internal combustion engine and the rotary electric machine are drivingly connected.

RELATED ART DOCUMENTS

Patent Documents

Patent Document 1: Japanese Unexamined Patent Application Publication No. 2005-176481 (JP 2005-176481 A)

SUMMARY OF THE DISCLOSURE

Problem to be Solved by the Invention

However, in a case in which there is a difference between the rotation speed of the internal combustion engine and the rotation speed of the rotary electric machine when transitioning from the eTC mode to the hybrid mode, there is a possibility that the second engagement device cannot be smoothly engaged. In particular, in the eTC mode, although the distribution differential gear mechanism operates in a differential state, the transition from the eTC mode to the hybrid mode is not made in a differential state, and the second engagement device is engaged in a state in which each rotation element rotates at a constant speed. However, such an engagement period is not long, and it is not easy to smoothly engage the second engagement device.

In view of the above background, it is desired to provide a technique for smoothly engaging an engagement device when an operation mode is transitioned from an electric torque converter mode to a hybrid mode.

Means for Solving the Problem

In view of the above, a control device of a vehicle drive device is a control device of a vehicle drive device in which a control target is the vehicle drive device. The control device includes: an input member drivingly connected to an internal combustion engine; an output member drivingly connected to a wheel; a rotary electric machine; a distribution differential gear mechanism including a first rotation element, a second rotation element, and a third rotation element, in which the first rotation element is drivingly connected to the input member, and the third rotation element is drivingly connected to a rotor of the rotary electric machine; a transmission mechanism that performs power transmission between at least the second rotation element and the output member; a first engagement device that is arranged in a power transmission path between the input member and the first rotation element and that connects and disconnects power transmission between the input member and the first rotation element; and a second engagement device that connects and disconnects power transmission between two selected from three rotation elements that are the first rotation element, the second rotation element, and the third rotation element, in which the control device can execute a first mode in which the first engagement device is in an engagement state, and the second engagement device is in a released state, and torques of the internal combustion engine and the rotary electric machine are transmitted to the output member, and a second mode in which the first engagement device and the second engagement device are in the engagement state and the torques of the internal combustion engine and the rotary electric machine are transmitted to the output member, in which when transitioning from the first mode to the second mode in a state in which a rotation speed of the output member is being increased, while a rotation speed of the second rotation element is lower than a rotation speed of the first rotation element, and a rotation speed difference between the rotation speed of the second rotation element and the rotation speed of the first rotation element is larger than a specified synchronization threshold, the control device executes an asynchronization control in which the internal combustion engine is caused to output a target torque, and the rotary electric machine is controlled so as to cause a rotation speed of the third rotation element to follow the rotation speed of the first rotation element and the rotation speed of the second rotation element, when the rotation speed difference between the rotation speed of the second rotation element and the rotation speed of the first rotation element becomes equal to or less than the synchronization threshold due to an increase in the rotation speed of the output member, the control device executes a synchronization maintaining control of maintaining the rotation speed difference at a specified difference rotation that is set to be equal to or less than the synchronization threshold, by performing a rotation speed control of the rotary electric machine in conjunction with the rotation speed of the second rotation element and by causing the internal combustion engine to output the target torque, and the control device executes an engagement control of transitioning the second engagement device from the released state to the engagement state while the synchronization maintaining control is being executed.

According to this configuration, when the rotation speed of the second rotation element (the speed of the vehicle) is lower than the rotation speed of the first rotation element (the rotation speed of the internal combustion engine), the vehicle can be appropriately accelerated in the first mode by causing the rotation speed of the third rotation element (the rotation speed of the rotary electric machine) to follow the rotation speed of the first rotation element and the rotation speed of the second rotation element. Further, after the speed of the vehicle is increased and the rotation speed difference between the rotation speed of the second rotation element (the speed of the vehicle) and the rotation speed of the first rotation element (the rotation speed of the internal combustion engine) becomes equal to or less than the specified synchronization threshold, the rotation speed difference between the three rotation elements of the distribution differential gear mechanism is maintained at a specified difference rotation that is set to be equal to or less than the synchronization threshold, by performing control of the rotation speed control of the internal combustion engine and the rotary electric machine to match the rotation speed of the second rotation element (synchronization maintaining control). Thus, it is possible maintain the rotation speed difference of the three rotation elements of the distribution differential gear mechanism to be small and it is possible to appropriately accelerate the vehicle. Since the engagement control of transitioning the second engagement device from the released state to the engagement state is executed during execution of the synchronization maintaining control, the engagement operation of the second engagement device can be performed smoothly. That is, according to this configuration, it is possible to smoothly engage the engagement device when transitioning the operation mode from the electric torque converter mode to the hybrid mode.

Further features and advantages will become clarified from the following description of exemplary and non-limiting embodiments, which are explained with reference to the drawings.

BRIEF DESCRIPTION OF THE DRAWINGS

FIG. 6 is a time chart when transitioning from the eTC mode to the first HV mode.

FIG. 7 is flowchart when transitioning from the eTC mode to the first HV mode.

MODES FOR CARRYING OUT THE DISCLOSURE

Figure 1:
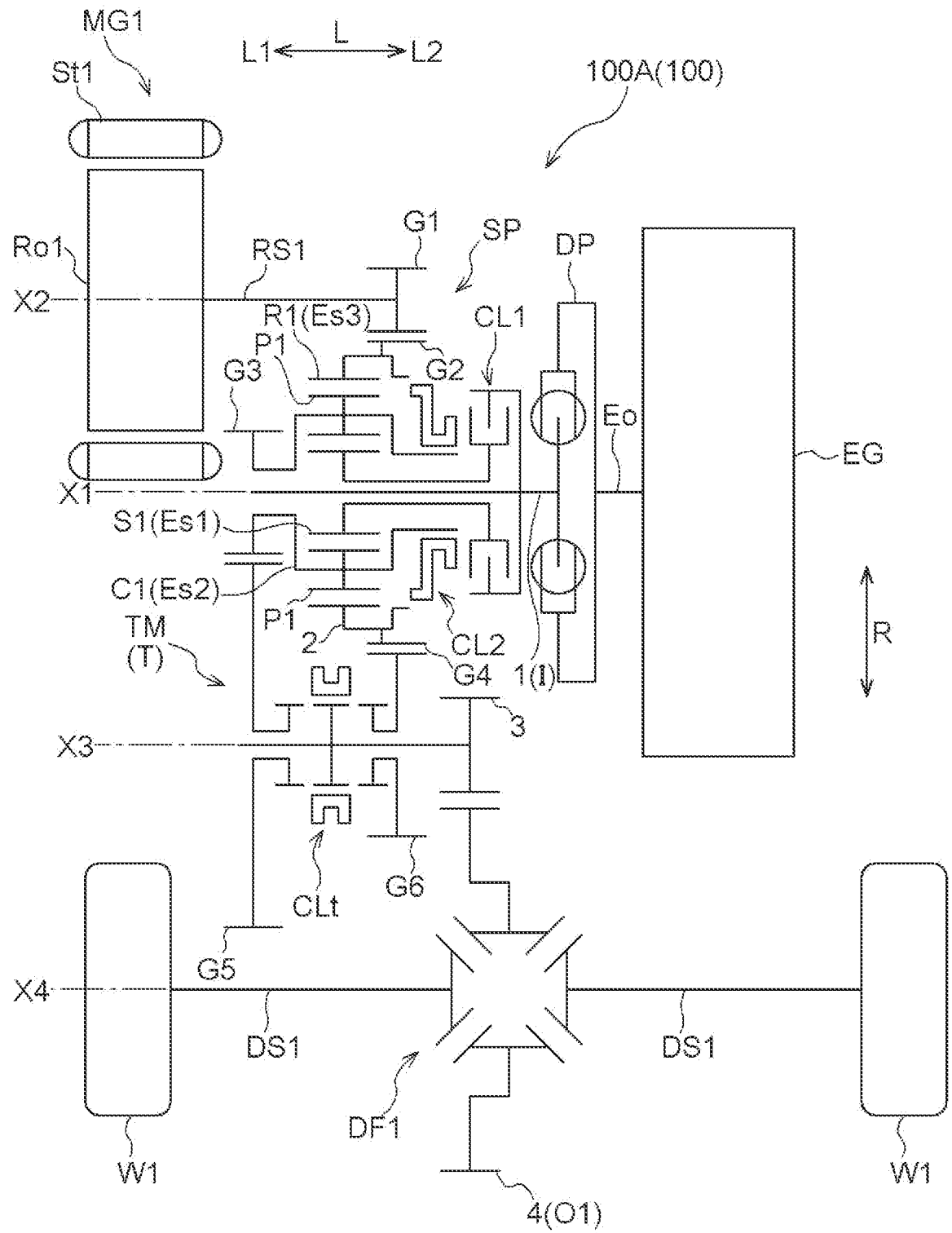
FIG. 1 is a skeleton diagram of a first drive unit of a vehicle drive device.
Figure 2:
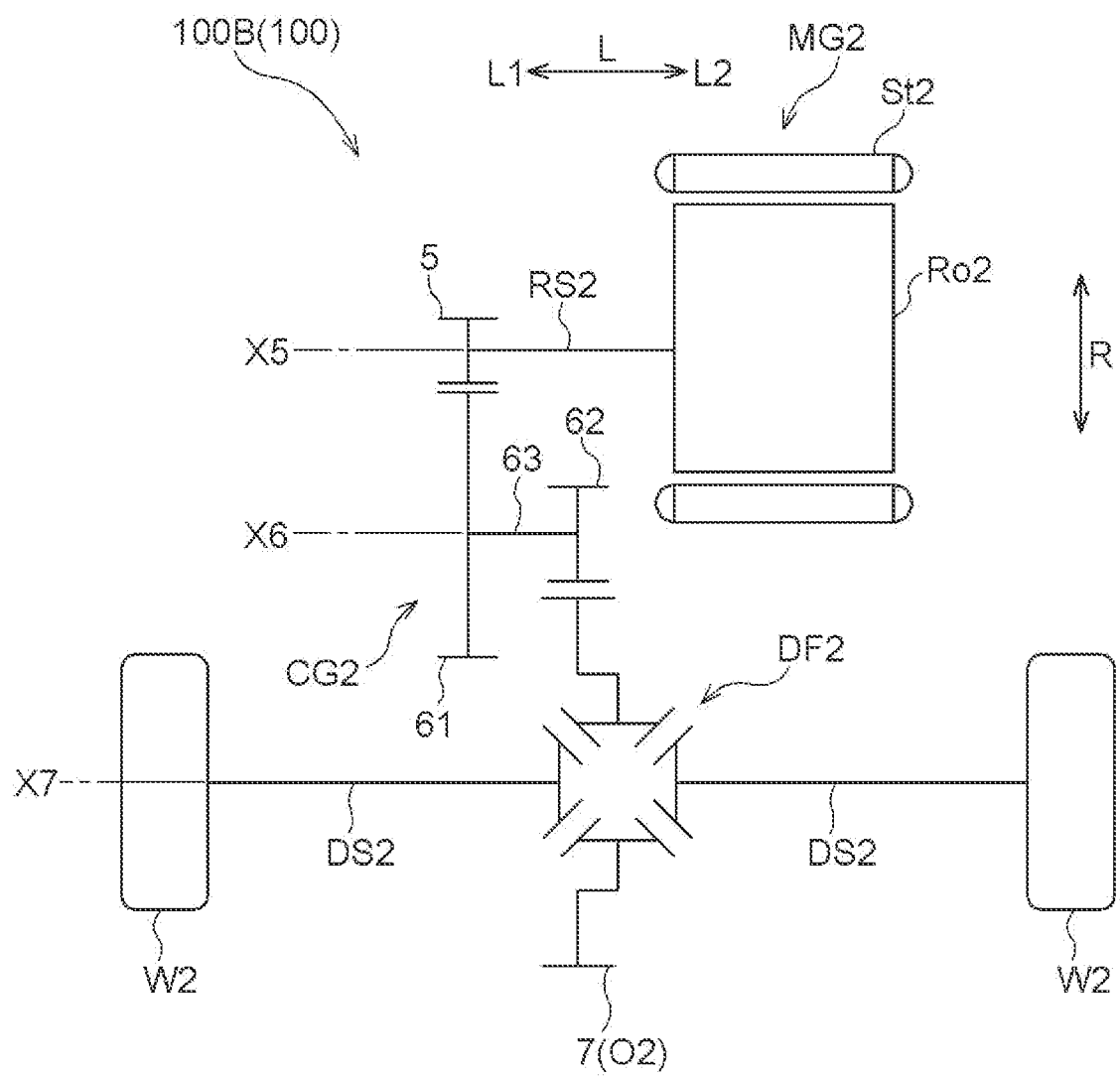
FIG. 2 is a skeleton diagram of a second drive unit of the vehicle drive device.

An embodiment of a control device of a vehicle drive device will be described below with reference to the drawings. As shown in FIGS. 1 and 2, a vehicle drive device 100 includes a first drive unit 100A and a second drive unit 100B. The first drive unit 100A sets a pair of first wheels W1 as a drive target, and the second drive unit 100B sets a pair of second wheels W2 as a drive target. In the present embodiment, the first wheels W1 are front wheels of a vehicle and the second wheels W2 are rear wheels of the vehicle.

As shown in FIG. 1, the first drive unit 100A includes an input member I that is drivingly connected to an internal combustion engine EG, a first output member O1 that is drivingly connected to the first wheels W1, a first rotary electric machine MG1 having a first stator St1 and a first rotor Ro1, a distribution differential gear mechanism SP, a transmission mechanism T having a transmission engagement device CLt, a first engagement device CL1, and a second engagement device CL2. In the present embodiment, the first drive unit 100A further includes a first output differential gear mechanism DF1.

In the present application, "drivingly connected" refers to a state in which two rotation elements are connected so that a driving force can be transmitted, and includes a state in which the two rotation elements are connected so as to rotate integrally or a state in which the two rotation elements are connected so as to be able to transmit a driving force via one or two or more transmitting members. Such transmitting members include various members that transmit rotation at the same speed or at a shifted speed, such as a shaft, a gear mechanism, a belt, and a chain, for example. The transmitting members may include an engagement device that selectively transmits rotation and driving force, such as a friction engagement device, a gear engagement device, and the like. However, when each rotation element of a planetary gear mechanism has a "driving connection", it refers to a state in which a plurality of rotation elements in the planetary gear mechanism are connected to each other without interposing other rotation elements.

The input member I, the distribution differential gear mechanism SP, the first engagement device CL1, and the second engagement device CL2 are arranged on a first axis X1 serving as a rotation axis of the first rotor Ro1. The first rotary electric machine MG1 is disposed on a second axis X2 serving as a rotation axis of the first rotary electric machine MG1. The transmission engagement device CLt of the transmission mechanism T is arranged on a third axis X3 serving as a rotation axis of the transmission engagement device CLt. In the present embodiment, the first output member O1 and the first output differential gear mechanism DF1 are arranged on a fourth axis X4 serving as a rotation axis of the first output member O1 and the first output differential gear mechanism DF1.

As shown in FIG. 2, the second drive unit 100B includes a second rotary electric machine MG2 having a second stator St2 and a second rotor Ro2, and a second output member O2 drivingly connected to the second wheels W2. In the present embodiment, the second drive unit 100B further includes a second counter gear mechanism CG2 and a second output differential gear mechanism DF2.

In the present embodiment, the second rotary electric machine MG2 is arranged on a fifth axis X5 serving as a rotation axis of the second rotor Ro2. Furthermore, in the present embodiment, the second counter gear mechanism CG2 is arranged on a sixth axis X6 serving as a rotation axis of the second counter gear mechanism CG2. Further, in the present embodiment, the second output member O2 and the second output differential gear mechanism DF2 are arranged on a seventh axis X7 serving as a rotation axis of the second output member O2 and the second output differential gear mechanism DF2.

In the present embodiment, the above-described first to seventh axes X1 to X7 are arranged in parallel to each other. In the following description, a direction parallel to the first axis X1 to the seventh axis X7 will be referred to as an "axial direction L" of the vehicle drive device 100. As shown in FIG. 1, in the axial direction L, a side on which the input member I is arranged with respect to the internal combustion engine EG is defined as an "axial direction first side L1", and the opposite side is defined as an "axial direction second side L2". Further, a direction orthogonal to each of the first axis X1 to the seventh axis X7 is defined as a "radial direction R" with respect to each axis. When it is not necessary to distinguish the axis to be used as a reference, or when the axis to be used as a reference is clear, the direction may be simply referred to as the "radial direction R".

In the present embodiment, the input member I is an input shaft 1 extending along the axial direction L. The input shaft 1 is drivingly connected to an output shaft Eo of the internal combustion engine EG via a damper device DP that damps fluctuations in a transmitted torque. The internal combustion engine EG is a motor (gasoline engine, diesel engine, and the like) that is driven by combustion of fuel to take out driving force.

The first rotary electric machine MG1 has a function as a motor (electric motor) that receives supply of electric power to generate driving force, and a function as a generator (electric power generator) that receives supply of driving force to generate electric power. Specifically, the first rotary electric machine MG1 is electrically connected to a power storage device BT (see FIG. 3) such as a battery or a capacitor. The first rotary electric machine MG1 is powered by electric power stored in the power storage device BT to generate a driving force. In addition, the first rotary electric machine MG1 generates electric power by using the driving force of the internal combustion engine EG or the driving force transmitted from the first output member O1 to charge the power storage device BT.

The first stator St1 of the first rotary electric machine MG1 is fixed to a non-rotating member (for example, a case that houses the first rotary electric machine MG1 and the like). The first rotor Ro1 of the first rotary electric machine MG1 is rotatably supported with respect to the first stator St1. In the present embodiment, the first rotor Ro1 is arranged inside in the radial direction R with respect to the first stator St1.

The distribution differential gear mechanism SP includes a first distribution rotation element Es1, a second distribution rotation element Es2, and a third distribution rotation element Es3. The first distribution rotation element Es1 is drivingly connected to the input member I. The third distribution rotation element Es3 is drivingly connected to the first rotor Ro1.

In the present embodiment, the distribution differential gear mechanism SP is a planetary gear mechanism including a first sun gear S1, a first carrier C1, and a first ring gear R1. In this example, the distribution differential gear mechanism SP is a single pinion type planetary gear mechanism that includes the first carrier C1 that supports the first pinion gear P1, the first sun gear S1 that meshes with the first pinion gear P1, and the first ring gear R1 that is arranged outside the first sun gear S1 in the radial direction R and that meshes with the first pinion gear P1.

In the present embodiment, the first distribution rotation element Es1 is the first sun gear S1. Furthermore, in the present embodiment, the second distribution rotation element Es2 is the first carrier C1. Further, in the present embodiment, the third distribution rotation element Es3 is the first ring gear R1. Thus, the rotation speed order of each rotation element of the distribution differential gear mechanism SP according to the present embodiment is the order of the first distribution rotation element Es1, the second distribution rotation element Es2, and the third distribution rotation element Es3.

Here, "the rotation speed order" means the rotation speed order in a rotation state of each rotation element. Although the rotation speed of each rotation element changes depending on the rotation state of the planetary gear mechanism, the high-low rotation speed order of each rotation element is fixed since it is determined by the structure of the planetary gear mechanism. The rotation speed order of each rotation element is the same as an arrangement order in the velocity diagram (see FIGS. 4, 5, and the like) of each rotation element. Here, the "arrangement order of each rotation element in the velocity diagram" is the order in which the axis corresponding to each rotation element in the velocity diagram are arranged along a direction orthogonal to the axis. Although the arrangement direction of the axis corresponding to each rotation element in the velocity diagram differs depending on how the velocity diagram is drawn, the order of arrangement is fixed because it is determined by the structure of the planetary gear mechanism.

In the present embodiment, the first drive unit 100A includes a first gear G1 that rotates integrally with the first rotor Ro1, and a second gear G2 that is drivingly connected to the first gear G1.

In the present embodiment, the first gear G1 is arranged on the second axis X2. The first gear G1 is coupled to the first rotor Ro1 via a first rotor shaft RS1 extending along the axial direction L so that the first gear G1 rotates integrally with the first rotor Ro1. In the present embodiment, the second gear G2 meshes with the first gear G1. Also, the second gear G2 is arranged on the first axis X1. Further, in the present embodiment, the second gear G2 is connected to the first ring gear R1 so as to rotate integrally with the first ring gear R1. In this example, a cylindrical gear forming member 2 in which the first axis X1 serves as its axis is provided. The second gear G2 is formed on an outer peripheral surface of the gear forming member 2, and the first ring gear R1 is formed on an inner peripheral surface of the gear forming member 2.

The transmission mechanism T transmits the rotation transmitted from the distribution differential gear mechanism SP to the first output member O1. The transmission engagement device CLt of the transmission mechanism T is an engagement device for switching the state of power transmission. In the present embodiment, the transmission mechanism T is a transmission TM that can form a plurality of shift speeds with different speed ratios.

The transmission TM shifts the rotation transmitted from the distribution differential gear mechanism SP at a speed ratio corresponding to a shift speed formed by the transmission engagement device CLt, and transmits the rotation to the first output member O1. When the speed ratio corresponding to the shift speed formed by the transmission engagement device CLt is 1, the transmission TM directly transmits the rotation transmitted from the distribution differential gear mechanism SP to the first output member O1. The transmission engagement device CLt forms at least either one of two shift speeds with different speed ratios. In the present embodiment, the transmission engagement device CLt forms either a first shift speed (low speed) ST1 having a relatively large speed ratio or a second shift speed (high speed) ST2 having a speed ratio smaller than that of the first shift speed ST1.

In the present embodiment, the transmission TM includes a third gear G3, a fourth gear G4, a fifth gear G5, a sixth gear G6, and a transmission output gear 3. The third gear G3 and the fourth gear G4 are arranged coaxially. In the present embodiment, the third gear G3 and the fourth gear G4 are arranged on the first axis X1. The third gear G3 is coupled so as to rotate integrally with the first carrier C1 of the distribution differential gear mechanism SP. In the present embodiment, the third gear G3 is arranged on the axial direction first side L1 with respect to the distribution differential gear mechanism SP.

The fourth gear G4 is coupled to the first ring gear R1 of the distribution differential gear mechanism SP so as to rotate integrally with the first ring gear R1. Further, in the present embodiment, the fourth gear G4 also functions as the second gear G2. In other words, the second gear G2 and the fourth gear G4 are formed on the outer peripheral surface of the gear forming member 2 as one gear. As a result, a manufacturing cost of the vehicle drive device 100 (first drive unit 100A) can be reduced compared to a configuration in which the second gear G2 and the fourth gear G4 are provided independently.

The fifth gear G5 meshes with the third gear G3. The sixth gear G6 meshes with the fourth gear G4. In the present embodiment, the sixth gear G6 meshes with the fourth gear G4 (second gear G2) at a position different from that of the first gear G1 in a circumferential direction of the fourth gear G4. The transmission output gear 3 is configured to be rotatable relative to the fifth gear G5 and the sixth gear G6. The fifth gear G5, the sixth gear G6, and the transmission output gear 3 are arranged on the third axis X3. In the present embodiment, the fifth gear G5, the sixth gear G6, and the transmission output gear 3 are arranged side by side in the axial direction L in the stated order, from the axial direction first side L1 toward the axial direction second side L2.

The number of teeth of the third gear G3 and the number of teeth of the fourth gear G4 are different. That is, an outer diameter of the third gear G3 and an outer diameter of the fourth gear G4 are different. As described above, the third gear G3 and the fourth gear G4 are arranged coaxially, and the fifth gear G5 meshing with the third gear G3 and the sixth gear G6 meshing with the fourth gear G4 are arranged coaxially. Thus, when the outer diameter of the third gear G3 is smaller than the outer diameter of the fourth gear G4, an outer diameter of the fifth gear G5 is larger than an outer diameter of the sixth gear G6. On the other hand, when the outer diameter of the third gear G3 is larger than the outer diameter of the fourth gear G4, the outer diameter of the fifth gear G5 is smaller than the outer diameter of the sixth gear G6. Thus, a gear ratio of the fifth gear G5 to the third gear G3 and a gear ratio of the sixth gear G6 to the fourth gear G4 are different. In the present embodiment, the outer diameter of the third gear C33 is smaller than the outer diameter of the fourth gear G4, and the number of teeth of the third gear G3 is smaller than that of the fourth gear G4. Thus, in the present embodiment, the outer diameter of the fifth gear G5 is larger than the outer diameter of the sixth gear G6, and the number of teeth of the fifth gear (35 is larger than that of the sixth gear G6. Therefore, the gear ratio of the fifth gear G5 to the third gear G3 is greater than the gear ratio of the sixth gear G6 to the fourth gear G4.

In the present embodiment, the transmission engagement device CLt is configured to connect either the fifth gear G5 or the sixth gear G6 to the transmission output gear 3. As described above, in the present embodiment, the gear ratio of the fifth gear G5 to the third gear G3 is greater than the gear ratio of the sixth gear G6 to the fourth gear G4. Therefore, when the transmission engagement device CLt connects the fifth gear G5 to the transmission output gear 3, the first shift speed (low speed) ST1 having a speed ratio larger than that of the second shift speed ST2 is formed. In contrast, when the transmission engagement device CLt connects the sixth gear G6 to the transmission output gear 3, the second shift speed (high speed) ST2 having a speed ratio smaller than that of the first shift speed ST1 is formed.

Furthermore, in the present embodiment, the transmission engagement device CLt is configured to be switchable to a neutral state in which the transmission mechanism is caused to not transmit power. When the transmission engagement device CLt is in the neutral state, the state is a state in which the transmission mechanism T does not transmit the rotation transmitted from the distribution differential gear mechanism SP to the first output member O1, that is, a state in which the driving force of neither the internal combustion engine EG or the first rotary electric machine MG1 is transmitted to the first wheels W1. In this example, the transmission engagement device CLt is a meshing type engagement device (dog clutch) configured to be able to switch between an engagement state and a released state by moving an engagement drive member (dog sleeve) by an actuator such as a solenoid, an electric motor, or a hydraulic cylinder. Of course, this does not prevent the transmission engagement device CLt from being configured by a friction engagement device.

The first output differential gear mechanism DF1 is configured to distribute the rotation of the first output member O1 to the pair of first wheels W1. In the present embodiment, the first output differential gear mechanism DF1 is a bevel gear type differential gear mechanism. Specifically, the first output differential gear mechanism DF1 has a hollow first differential case, a first pinion shaft supported so as to rotate integrally with the first differential case, and a pair of first pinion gears rotatably supported with respect to the first pinion shaft, and a pair of first side gears that mesh with the pair of first pinion gears and that function as distribution output elements. The first differential case houses the first pinion shaft, the pair of first pinion gears, and the pair of first side gears. In the present embodiment, the first differential input gear 4 serving as the first output member O1 is connected to the first differential case so as to protrude outward of the first differential case in the radial direction R. A first drive shaft DS1 drivingly connected to the first wheels W1 is rotatably connected to each of the pair of first side gears. Thus, the first output differential gear mechanism DF1 distributes the rotation of the first output member O1 (first differential input gear 4) to the pair of first wheels W1 via the pair of first drive shafts DS1.

The first engagement device CL1 is arranged in a power transmission path between the input member I and the first distribution rotation element Es1 of the distribution differential gear mechanism SP. In the present embodiment, the first engagement device CL1 is configured to connect and disconnect power transmission between the input member I and the first sun gear S1. In the present example, the first engagement device CL1 is a friction engagement device that includes a pair of friction members and in which an engagement state between the pair of friction members is controlled by hydraulic pressure. Due to this, a transfer torque capacity of the first engagement device CL1 can be controlled by putting the first engagement device CL1 into a sliding engagement state. Thus, when the internal combustion engine EG is started by using the driving force of the first rotary electric machine MG1, a torque transmitted from the first rotary electric machine MG1 to the internal combustion engine EG can be controlled. Thus, there is no need to temporarily stop the first rotary electric machine MG1. Here, the "sliding engagement state" is an engagement state in which there is a rotation speed difference (slippage) between a pair of friction members of the friction engagement device.

The second engagement device CL2 is configured to connect and disconnect the power transmission between two distribution rotation elements selected from three rotation elements that are the first distribution rotation element Es1, the second distribution rotation element Es2, and the third distribution rotation element Es3 of the distribution differential gear mechanism SP. In the present embodiment, the second engagement device CL2 is configured to connect and disconnect the power transmission between the first carrier C1 serving as the second distribution rotation element Est and the first ring gear R1 serving as the third distribution rotation element Es3. In this example, the second engagement device CL2 is a meshing type engagement device (dog clutch) configured to be able to switch between an engagement state and a released state by moving an engagement drive member (dog sleeve) by an actuator such as a solenoid, an electric motor, or a hydraulic cylinder. In the present embodiment, the second engagement device CL2 is arranged between the first engagement device CL1 and the distribution differential gear mechanism SP in the axial direction L. Of course, this does not prevent the second engagement device CL2 from being configured by a friction engagement device.

As shown in FIG. 2, in the present embodiment, the second rotary electric machine MG2 functions as a driving force source of the second wheels W2. That is, in the present embodiment, the second rotary electric machine MG2 is drivingly connected to the second output member O2 without interposing the first output member O1.

The second rotary electric machine MG2 has a function as a motor (electric motor) that receives supply of electric power to generate driving force, and a function as a generator (electric power generator) that receives supply of driving force to generate electric power. Specifically, the second rotary electric machine MG2 is electrically connected to the power storage device BT. The second rotary electric machine MG2 is powered by the electric power stored in the power storage device BT to generate a driving force. During regeneration, the second rotary electric machine MG2 generates power by the driving force transmitted from the second output member O2 to charge the power storage device BT.

The second stator St2 of the second rotary electric machine MG2 is fixed to a non-rotating member (for example, a case that houses the second rotary electric machine MG2 and the like). The second rotor Ro2 of the second rotary electric machine MG2 is rotatably supported with respect to the second stator St2. In the present embodiment, the second rotor Ro2 is arranged inside in the radial direction R with respect to the second stator St2.

In the present embodiment, the second drive unit 100B includes the rotor gear 5 that rotates integrally with the second rotor Ro2. The rotor gear 5 is arranged on the fifth axis X5. The rotor gear 5 is coupled to the second rotor Ro2 via a second rotor shaft RS2 extending along the axial direction L so that the second gear G2 rotates integrally with the second rotor Ro2.

The second counter gear mechanism CG2 includes a second counter input gear 61, a second counter output gear 62, and a second counter shaft 63 that connects these gears (second counter input gear 61, second counter output gear 62) such that these gears rotate integrally. The second counter input gear 61 is an input element of the second counter gear mechanism CG2. The second counter input gear 61 meshes with the rotor gear 5. The second counter output gear 62 is an output element of the second counter gear mechanism CG2. In the present embodiment, the second counter output gear 62 is arranged on the axial direction second side L2 relative to the second counter input gear 61. In the present embodiment, the second counter output gear 62 is formed to have a smaller diameter than the second counter input gear 61. In the present embodiment, the second output member O2 is a second differential input gear 7 that meshes with the second counter output gear 62 of the second counter gear mechanism CG2.

The second output differential gear mechanism DF2 is configured to distribute the rotation of the second output member O2 to the pair of second wheels W2 In the present embodiment, the second output differential gear mechanism DF2 is a bevel gear type differential gear mechanism. Specifically, the second output differential gear mechanism DF2 has a hollow second differential case, a second pinion shaft supported so as to rotate integrally with the second differential case, a pair of second pinion gears rotatably supported with respect to the second pinion shaft, and a pair of second side gears that mesh with the pair of second pinion gears and that function as distribution output elements. The second differential case houses the second pinion shaft, the pair of second pinion gears, and the pair of second side gears. In the present embodiment, the second differential input gear 7 serving as the second output member O2 is connected to the second differential case so as to protrude outward of the second differential case in the radial direction R. A second drive shaft DS2 drivingly connected to the second wheels W2 is rotatably connected to each of the pair of second side gears. Thus, the second output differential gear mechanism DF2 distributes the rotation of the second output member O2 (second differential input gear 7) to the pair of second wheels W2 via the pair of second drive shafts DS2.

Figure 3:
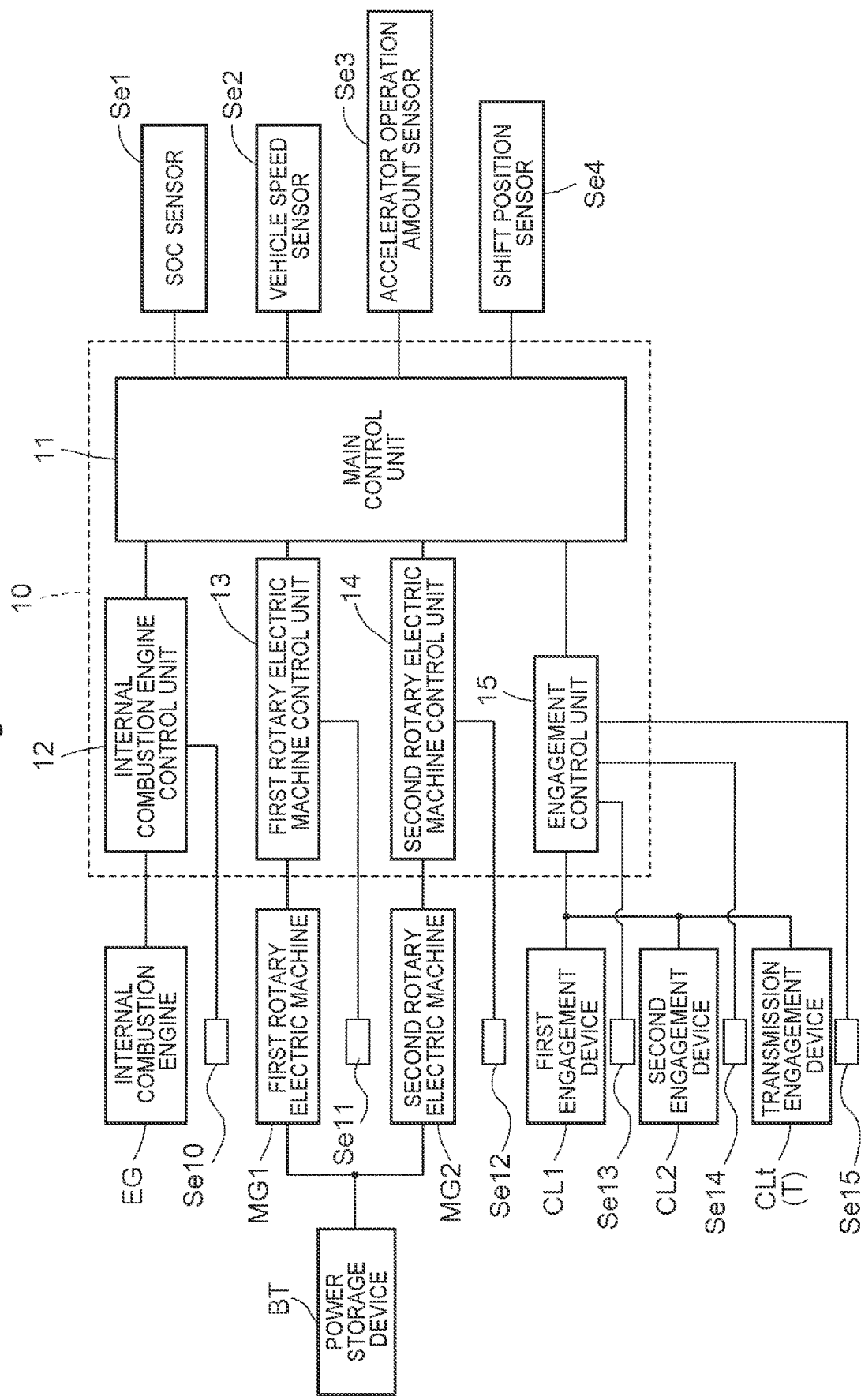
FIG. 3 is a control block diagram of a vehicle drive device.

As shown in FIG. 3, the vehicle drive device 100 includes a control device 10 for controlling each unit of the vehicle in which the vehicle drive device 100 is installed. In the present embodiment, the control device 10 includes a main control unit 11, an internal combustion engine control unit 12 that controls the internal combustion engine EG, a first rotary electric machine control unit 13 that controls the first rotary electric machine MG1, a second rotary electric machine control unit 14 that controls the second rotary electric machine MG2, and an engagement control unit 15 that controls engagement states of the first engagement device CL1, the second engagement device CL2, and the transmission engagement device CLt.

The main control unit 11 outputs a command, which controls the device that each control unit is in charge of, to each of the internal combustion engine control unit 12, the first rotary electric machine control unit 13, the second rotary electric machine control unit 14, and the engagement control unit 15. The internal combustion engine control unit 12 controls the internal combustion engine EG so that the internal combustion engine EG outputs a target torque commanded by the main control unit 11 or so that the internal combustion engine EG reaches a target rotation speed commanded by the main control unit 11. The internal combustion engine control unit 12 controls the internal combustion engine EG by using a detection result of an internal combustion engine sensor Se10 that detects the rotation speed of the output shaft Eo.

The first rotary electric machine control unit 13 controls the first rotary electric machine MG1 so that the first rotary electric machine MG1 outputs the target torque commanded by the main control unit 11 or so that the first rotary electric machine MG1 reaches the target rotation speed commanded by the main control unit 11. The first rotary electric machine control unit 13 controls the first rotary electric machine MG1 based on a detection result of a first rotary electric machine sensor Se11 such as a rotation sensor that detects a rotation speed and a rotation position of the first rotor Ro1 and a current sensor that detects a current flowing through a stator coil. The second rotary electric machine control unit 14 controls the second rotary electric machine MG2 so that the second rotary electric machine MG2 outputs the target torque commanded by the main control unit 11 or so that the second rotary electric machine MG2 reaches the target rotation speed commanded by the main control unit 11. The second rotary electric machine control unit 14 controls the second rotary electric machine MG2 based on a detection result of a second rotary electric machine sensor Se12 such as a rotation sensor that detects a rotation speed and a rotation position of the second rotor Ro2 and a current sensor that detects a current flowing through a stator coil.

The engagement control unit 15 controls actuators (not shown) for operating the first engagement device CL1, the second engagement device CL2, and the transmission engagement device CLt so that each of the first engagement device CL1, the second engagement device CL2, and the transmission engagement device CLt are in the engagement state commanded by the main control unit 11. Each of the first engagement device CL1, the second engagement device CL2, and the transmission engagement device CLt is provided with a first engagement device sensor Se13, a second engagement device sensor Se14, and a transmission engagement device sensor Se15, respectively. The engagement device sensors are configured of a position detection sensor, a hydraulic pressure sensor, and the like and detect an engagement state of each engagement device. For example, when the second engagement device CL2 and the transmission engagement device CLt are configured of a mesh engagement device (dog clutch) as described above, the second engagement device sensor Se14 and the transmission engagement device sensor Se15 are operation detection sensors (sleeve position detection sensor, hydraulic pressure detection sensor) that detect a movement amount of the engagement drive member (such as a dog sleeve) depending on a position and a hydraulic pressure of the engagement drive member that moves in conjunction with a state transition from the released state to the engagement state.

Further, the main control unit 11 is configured to be able to acquire information from sensors provided in each unit of the vehicle in order to acquire information of each unit of the vehicle in which the vehicle drive device 100 is installed. In the present embodiment, the main control unit 11 is configured to be able to acquire information from the SOC sensor Se1, the vehicle speed sensor Se2, the accelerator operation amount sensor Se3, and the shill position sensor Se4.

The SOC sensor Se1 is a sensor for detecting the state of the power storage device BT electrically connected to the first rotary electric machine MG1 and the second rotary electric machine MG2. The SOC sensor Set is configured of, for example, a voltage sensor, a current sensor, or the like. The main control unit 11 determines a charged amount (SOC: State of Charge) of the storage device BT based on information of a voltage value, a current value, and the like that are output from the SOC sensor Se1.

The vehicle speed sensor Se2 is a sensor that detects a traveling speed (vehicle speed) of the vehicle in which the vehicle drive device 100 is installed. In the present embodiment, the vehicle speed sensor Se2 is a sensor for detecting the rotation speed of the first output member O1. The main control unit 11 calculates the rotation speed (angular velocity) of the first output member O1 based on the information of the rotation speed output from the vehicle speed sensor Se2. Since the rotation speed of the first output member O1 is proportional to the vehicle speed, the main control unit 11 calculates the vehicle speed based on a detection signal of the vehicle speed sensor Se2.

The accelerator operation amount sensor Se3 is a sensor for detecting an operation amount, by a driver, of an accelerator pedal provided in the vehicle in which vehicle drive device 100 is installed. The main control unit 11 calculates the operation amount of the accelerator pedal by the driver, based on a detection signal of the accelerator operation amount sensor Se3.

The shift position sensor Se4 is a sensor for detecting a selected position (shift position) of a shift lever operated by the driver of the vehicle in which vehicle drive device 100 is installed. The main control unit 11 calculates the shift position based on a detection signal of the shift position sensor Se4. The shift lever is configured to select a parking range (P range), a reverse travel range (R range), a neutral range (N range), a forward travel range (D range), and the like.

The main control unit 11 selects a plurality of operation modes in the vehicle drive device 100, which will be described later, based on the information from the above sensors. The main control unit 11 controls, via the engagement control unit 15, each of the first engagement device CL1, the second engagement device CL2, and the transmission engagement device CLt to be in the engagement state in accordance with the selected operation mode, so as to perform switching to the selected operation mode. Furthermore, via the internal combustion engine control unit 12, the first rotary electric machine control unit 13, and the second rotary electric machine control unit 14, the main control unit 11 cooperatively controls the operation state of the internal combustion engine EG, the first rotary electric machine MG1, and the second rotary electric machine MG2 so as to make traveling of the vehicle appropriate in accordance with the selected operating mode possible.

Table 1 below shows a state of the engagement device in each operation mode of the vehicle drive device 100. Table 1 shows the states of the first engagement device CL1, the second engagement device CL2, and the transmission engagement device CLt in each operation mode of the vehicle drive device 100 of the present embodiment. In columns of the first engagement device CL1 and the second engagement device CL2 in Table 1, "◯" indicates that a target engagement device is in the engagement state, and "x" indicates that the target engagement device is in the released state. Further, in a column of the transmission engagement device CLt in Table 1, "Lo" indicates that the transmission engagement device CLt forms the first shift speed (low speed) ST1, and "Hi" indicates that the transmission engagement device CLt forms the second shift speed (high speed) ST2, and "N" indicates that the transmission engagement device CLt is in the neutral state.

TABLE 1

| Operation mode | CL1 | CL2 | CLt |
|---|---|---|---|
| eTC mode | ○ | × | Lo |
| First EV mode (EV Lo) | × | ○ | Lo |
| Second EV mode (EV Hi) | × | ○ | Hi |
| First HV mode (HV Lo) | ○ | ○ | Lo |
| Second HV mode (HV Hi) | ○ | ○ | Hi |
| Charging mode | ○ | ○ | N |

As shown in Table 1, in the present embodiment, the vehicle drive device 100 includes, as the operation modes, an electric type torque converter mode (hereinafter referred to as the "eTC mode"), the first EV mode (EV Lo), the second EV mode (EV Hi), the first HV mode (HV Lo), the second HV mode (HV Hi), and the charging mode.

The eTC mode is a mode in which the distribution differential gear mechanism SP amplifies the torque of the internal combustion engine EG by using the torque of the first rotary electric machine MG1 as a reaction force and transmits the amplified torque to the first output member O1 side to make the vehicle travel. This mode is called a so-called electric torque converter mode because the torque of the internal combustion engine EG can be amplified and transmitted to the first output member O1. The eTC mode is selected when the vehicle speed is relatively low, such as when the vehicle starts moving. In the eTC mode of the present embodiment, the first rotary electric machine MG1 rotates negatively while outputting positive torque to generate power, and the distribution differential gear mechanism SP outputs a torque larger than the torque of the internal combustion engine EG to the second distribution rotation element Est (first carrier C1) by adding the torque of the first rotary electric machine MG1 and the torque of the internal combustion engine EG. Then, the rotation of the second distribution rotation element Est is shifted in the transmission TM at a speed ratio corresponding to the first shift speed ST1 and is transmitted to the transmission output gear 3 (see FIG. 4). Therefore, the eTC mode can be selected even when the charged amount of the power storage device BT is relatively low.

As shown in Table 1, in the eTC mode, the first engagement device CL1 is in the engagement state, the second engagement device CL2 is in the released state, and the transmission engagement device CIA is controlled to be in a state in which power transmission to the transmission mechanism T is performed. In the present embodiment, the transmission engagement device CIA is controlled so as to be in a state in which the first shift speed (low speed) ST1 is established. In the eTC mode, the internal combustion engine EG and the first rotary electric machine MG1 are controlled to output torque. Thus, the eTC mode corresponds to the "first mode" in which the first engagement device CL1 is in the engagement state, the second engagement device CL2 is in the released state, and the torque of the internal combustion engine EG and the first rotary electric machine MG1 is transmitted to the first output member O1.

The first EV mode (EV Lo) is a mode in which the vehicle travels at a relatively low speed with the driving force of only the first rotary electric machine MG1 out of the internal combustion engine EG and the first rotary electric machine MG1. The second EV mode (EV Hi) is a mode in which the vehicle travels at a relatively high speed with the driving force of only the first rotary electric machine MG1 out of the internal combustion engine EG and the first rotary electric machine MG1. The first HV mode (HV Lo) is a mode in which the vehicle travels at a relatively low speed with the driving forces of both the internal combustion engine EG and the first rotary electric machine MG1.

The second HV mode (HV Hi) is a mode in which the vehicle travels at a relatively high speed by the driving forces of both the internal combustion engine EG and the first rotary electric machine MG1. The first EV mode and the second EV mode, and the first HV mode and the second HV mode are selected when the vehicle speed and the charged amount of the power storage device BT are each equal to or higher than a specified value.

In the first EV mode, the first engagement device CL1 is in the released state, the second engagement device CL2 is in the engagement state, and the transmission engagement device CLt is controlled to be in a state in which power transmission to the transmission mechanism T is performed. In the present embodiment, the transmission engagement device CLt is controlled so as to be in a state in which the first shift speed (low speed) ST1 is established. On the other hand, in the second EV mode, the first engagement device CL1 is in the released state, the second engagement device CL2 is in the engagement state, and the transmission engagement device CLt is controlled to be in a state in which power transmission to the transmission mechanism T is performed. In the present embodiment, the transmission engagement device CLt is controlled so as to be in a state in which the second shift speed (high speed) ST2 is established. In the first EV mode and the second EV mode, the internal combustion engine EG is stopped and the first rotary electric machine MG1 is controlled to output the torque.

In the first EV mode and the second EV mode, the state is such that the internal combustion engine EG is separated from the distribution differential gear mechanism SP by the first engagement device CL1 being in the released state, and the three rotation elements (Es1 to Es3) of the distribution differential gear mechanism SP rotate integrally with each other by the second engagement device CL2 being in the engagement state. As a result, the rotation of the first rotary electric machine MG1 transmitted from the first gear G1 to the second gear G2 is transmitted as it is to the third gear G3 and the fourth gear G4 of the transmission TM. The rotation transmitted to the transmission TM is shifted to the speed ratio of the first shift speed ST1 in the first EV mode and to the speed ratio of the second shift speed ST2 in the second EV mode, depending on the state of the transmission engagement device CLt, and the rotation is transmitted to the transmission output gear 3.

In the first HV mode, the first engagement device CL1 is in the engagement state, the second engagement device CL2 is in the engagement state, and the transmission engagement device CLt is controlled to be in a state in which power transmission to the transmission mechanism T is performed. In the present embodiment, the transmission engagement device CLt is controlled so as to be in a state in which the first shift speed (low speed) ST1 is established. On the other hand, in the second HV mode, the first engagement device CL1 is in the engagement state, the second engagement device CL2 is in the engagement state, and the transmission engagement device CLt is controlled to be in a state in which power transmission to the transmission mechanism T is performed. In the present embodiment, the transmission engagement device CLt is controlled so as to be in a state in which the second shift speed (high speed) ST2 is established. In the first HV mode and the second RV mode, the internal combustion engine EG and the first rotary electric machine MG1 are controlled to output the torque. Thus, the first HV mode and the second HV mode correspond to the "second mode" in which the first engagement device CL1 and the second engagement device CL2 are in the engagement state, and the torque of the internal combustion engine EG and the first rotary electric machine MG1 are transmitted to the first output member O1. The second mode is called a so-called parallel hybrid mode.

In the first HV mode and the second HV mode, the state is such that the internal combustion engine EG is connected to the distribution differential gear mechanism SP by the first engagement device CL1 being in the engagement state, and the three rotation elements (Es1 to Es3) of the distribution differential gear mechanism SP rotate integrally with each other by the second engagement device CL2 being in the engagement state. As a result, the rotation of the internal combustion engine EG transmitted via the input member I and the rotation of the first rotary electric machine MG1 transmitted from the first gear G1 to the second gear G2 are transmitted as they are to the third gear G3 and the fourth gear G4 of the transmission TM. The rotation transmitted to the transmission TM is shifted to the speed ratio of the first shift speed ST1 in the first HV mode and to the speed ratio of the second shift speed ST2 in the second HV mode, depending on the state of the transmission engagement device CLt, and the rotation is transmitted to the transmission output gear 3.

The charging mode is a mode in which the power storage device BT is charged by the first rotary electric machine MG1 being caused to generate power by using the driving force of the internal combustion engine EU. The charging mode is selected when the charged amount in the power storage device BT is less than a specified value.

In the charging mode, the first engagement device CL1 is in the engagement state, the second engagement device CL2 is in the engagement state, and the transmission engagement device CLt is controlled to be in the neutral state. In the charging mode, a control is performed such that the internal combustion engine EG outputs a torque, and that the first rotary electric machine MG1 generates power by outputting a torque in a direction opposite to the rotation direction of the first rotor Ro1 rotated by the torque of the internal combustion engine EG. In the charging mode, the vehicle may be stopped, or the electric power generated by the first rotary electric machine MG1 may be used to power the second rotary electric machine MG2 and the driving force of the second rotary electric machine MG2 may be transmitted to the second wheels W2 so as to make the vehicle travel. The mode in which the vehicle travels due to the driving force of the second rotary electric machine MG2 while being in the charging mode is called a so-called series hybrid mode.

Figure 4:
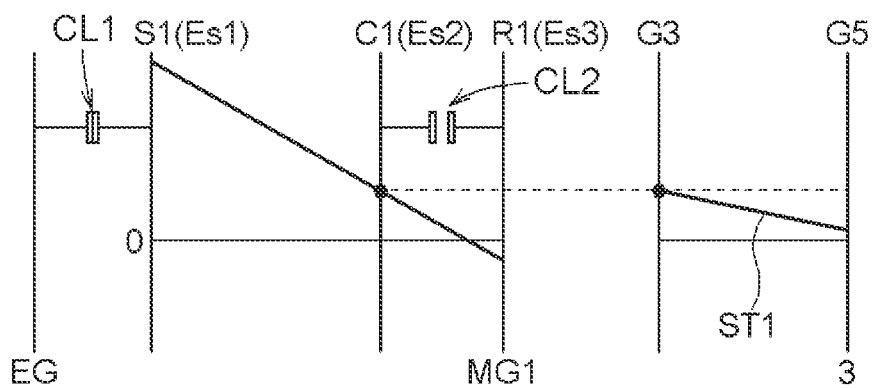
FIG. 4 is a velocity diagram of a distribution differential gear mechanism and a transmission mechanism in a first mode (eTC mode).

FIG. 4 shows a velocity diagram of the distribution differential gear mechanism SP and the transmission TM in the eTC mode of the present embodiment. In the velocity diagram of FIG. 4, the vertical axis corresponds to the rotation speed of each rotation element of the distribution differential gear mechanism SP and the transmission TM. Each of the plurality of vertical lines arranged in parallel corresponds to each rotation element of the distribution differential gear mechanism SP and the transmission TM. In the velocity diagram of FIG. 4, the symbols shown above the vertical lines are the symbols of the corresponding rotation elements. The symbols shown below the vertical lines are the symbols of the elements drivingly connected to the rotation elements corresponding to the symbols shown above. The method of drawing such velocity diagrams is the same for other velocity diagrams such as FIG. 5.

As described above, in the eTC mode of the present embodiment, the first engagement device CL1 is in the engagement state and the second engagement device CL2 is in the released state. As shown in FIG. 4, in the eTC mode of the present embodiment, the internal combustion engine EG rotates positively while outputting a positive torque, and the first rotary electric machine MG1 rotates negatively while outputting the positive torque to generate power. As a result, the torque greater than the torque of the internal combustion engine EG is transmitted to the first carrier C1 of the distribution differential gear mechanism SP. The rotation of the first carrier C1 rotated by this torque is transmitted to the third gear G3 of the transmission TM. Then, between the third gear G3 and the fifth gear G5, the rotation decelerated by the speed ratio corresponding to the first shift speed ST1 is transmitted to the transmission output gear 3.

Figure 5:
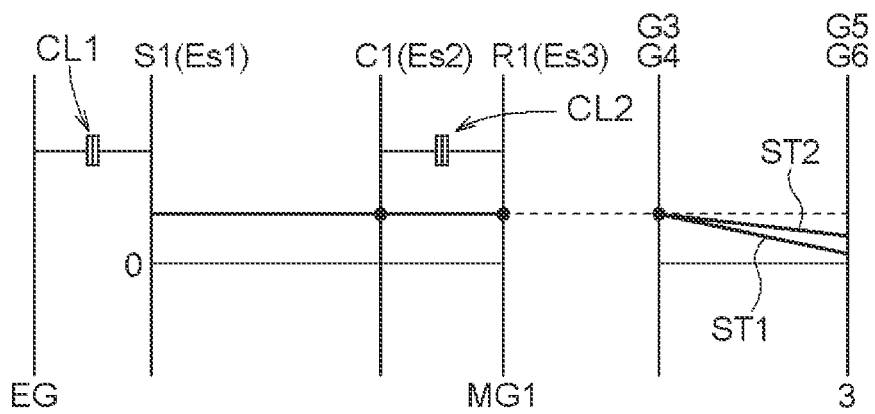
FIG. 5 is a velocity diagram of the distribution differential gear mechanism and the transmission mechanism in a second mode (first HV mode and second HV mode).

FIG. 5 shows a velocity diagram of the distribution differential gear mechanism SP and the transmission TM in the first HV mode and the second ITV mode of the present embodiment. As described above, in the first HV mode and the second HV mode, the first engagement device CL1 and the second engagement device CL2 are in the engagement state. In the first EV mode and the second EV mode, although the first engagement device CL1 is in the released state, the second engagement device CL2 is in the engagement state. Thus, the rotation state of the distribution differential gear mechanism SP is the same.

As shown in FIG. 5, in the first EV mode and the second EV mode, and the first HV mode and the second HV mode of the present embodiment, the second engagement device CL2 is set in the engagement state so that the three rotation elements (Es1 to Es3) of the distribution differential gear mechanism SP are brought into a state of rotating integrally with each other. In the first EV mode and the second EV mode, since the first engagement device CL1 is in the released state, the torque of the first rotary electric machine MG1 is transmitted to the three rotation elements Es1 to Es3) of the distribution differential gear mechanism SP that rotate integrally in this way. In contrast, in the first HV mode and the second HV mode, as shown in FIG. 5, since the first engagement device CL1 is in the released state, the torques of the internal combustion engine EG and the first rotary electric machine MG1 are transmitted.

Among the three rotation elements (Es1 to Es3) of the distribution differential gear mechanism SP that are rotated by these torques, the rotation output from the first carrier C1 that is the second distribution rotation element Est is transmitted to the third gear G3 of the transmission TM. In contrast, the rotation output from the first ring gear R1 that is the third distribution rotation element Es3 is transmitted to the fourth gear G4 of the transmission TM. In the first EV mode and the first HV mode, between the third gear G3 and the fifth gear G5, the rotation decelerated by the speed ratio corresponding to the first shift speed ST1 is transmitted to the transmission output gear 3. In contrast, between the fourth gear G4 and the sixth gear G6, in the second EV mode and the second HV mode, the rotation decelerated by the speed ratio corresponding to the second shift speed ST2 is transmitted to the transmission output gear 3.

By the way, in a transition from the eTC mode to the first HV mode, it is preferable that the second engagement device CL2 in the released state is engaged in a state in which the rotation speed of the internal combustion engine EG (the rotation speed of the first sun gear S1 (first distribution rotation element Es1)) and the rotation speed of the first rotary electric machine MG1 (the rotation speed of the first ring gear R1 (third distribution rotation element Es3)) are the same. However, as in the present embodiment, when the second engagement device CL2 is the mesh type engagement device, the second engagement device CL2 is more easily repelled than in the case of a frictional engagement device, and there is possibility that a so-called ratcheting occurs. As shown in FIG. 4, in the eTC mode, the distribution differential gear mechanism SP is in a differential state in which each rotation element has a rotational difference. However, in the first HV mode, as shown in FIG. 5, the distribution differential gear mechanism SIP rotates integrally with each rotation element without having a rotational difference.

As shown in FIG. 4, the control device 10 increases the rotation speed of the first rotary electric machine MG1 from the state in which there is a rotation speed difference between the first carrier C1 (second distribution rotation element Es2) and the first ring gear R1 (third distribution rotation element Es3), matches the rotation speeds of these two distribution rotation elements as shown in FIG. 5, and engages the second engagement device CL2. However, when transitioning from the eTC mode to the hybrid mode, when these rotation speeds are not well aligned, there is a possibility that the second engagement device CL2 is not engaged smoothly. In order to smoothly engage the second engagement device CL2, the rotation speed of the first carrier C1 (second distribution rotation element Es2) and the rotation speed of the first ring gear R1 (third distribution rotation element Es3) need to be appropriately controlled. Before the second engagement device CL2 is engaged, the control device 10 of the present embodiment controls the first rotary electric machine MG1 so that the rotation speed of the internal combustion engine EG and the rotation speed of the first rotary electric machine MG1 become similar to the rotation speed of the first carrier C1 (second distribution rotation element Es2), creates a state in which the second engagement device CL2 can be stably engaged, and suppresses ratchetting from occurring during the engagement of the second engagement device CL2.

When the control device 10 transitions from the eTC mode (first mode) to the first HV mode (second mode) in a state in which the rotation speed of the first output member O1 is being increased, that is, during acceleration, controls such as the following are performed. The control device 10 executes an asynchronous control in which the first rotary electric machine MG1 is controlled so that the internal combustion engine EG is caused to output the target torque and the rotation speed of the first ring gear R1 (third distribution rotation element Es3 (third rotation element)) is caused to follow the rotation speed of the first sun gear S1 and the rotation speed of the first carrier C1, while the rotation speed of the first carrier C1 (second distribution rotation element Es2 (second rotation element)) is lower than the rotation speed of the first sun gear S1 (first distribution rotation element Es1 (first rotation element)) and the rotation speed difference between the rotation speed of the first carrier C1 and the rotation speed of the first sun gear S1 is larger than a specified synchronization threshold. In the asynchronous control, the control device 10 performs a torque control of the first rotary electric machine MG1 so that the first rotary electric machine MG1 outputs the target torque. The asynchronous control can be said to be a control mode of the distribution differential gear mechanism SP. As shown in FIG. 6, in the asynchronous control, the rotation speed of the internal combustion engine EG (the rotation speed of the first sun gear S1) and the rotation speed of the first carrier C1 are not synchronized.

Further, when the rotation speed difference between the rotation speed of the first carrier C1 and the rotation speed of the first sun gear S1 becomes equal to or less than the synchronization threshold due to the increase in the rotation speed of the first output member O1, the control device 10 executes a synchronization maintaining control of maintaining the rotation speed difference below the synchronization threshold by causing the internal combustion engine EG to output the target torque and performing rotation speed control of the first rotary electric machine MG1 in accordance with the rotation speed of the first carrier C1. That is, unlike performing the torque control of the first rotary electric machine MG1 in the asynchronous control, the control device 10 performs the rotation speed control of the first rotary electric machine MG1 so that the first rotary electric machine MG1 reaches the target rotation speed, in the synchronization maintaining control. Then, the control device 10 executes an engagement control for transitioning the second engagement device CL2 from the released state to the engagement state during execution of the synchronization maintaining control.

In the above description, described as an example is a form in which, in the asynchronous control, the control device 10 performs the torque control of the first rotary electric machine MG1 so that the first rotary electric machine MG1 outputs the target torque. However, the control device 10 may perform the rotation speed control of the first rotary electric machine MG1 in addition to the torque control. Specifically, in addition to the torque control, the control device 10 may execute the rotation speed control in which the output torque of the first rotary electric machine MG1 is adjusted so as to correct a deviation of the rotation speed of the internal combustion engine EG (first sun gear S1) from a predetermined constant rotation speed. In other words, there is a case in which the rotation speed of the internal combustion engine EG deviates from the predetermined constant rotation speed, and it is also preferred that the rotation speed control of the first rotary electric machine MG1 is performed in addition to the torque control in order to correct the deviation with the rotation speed of the first rotary electric machine MG1.

Hereinafter, a description will be made with reference to a time chart (FIG. 6) at the time of transition from the eTC mode to the first HV mode, and a flowchart (FIG. 7). As shown in FIG. 6, in the eTC mode, the rotation speed of the first rotary electric machine MG1 is increased while the rotation speed of the internal combustion engine EG is kept constant. As shown in FIGS. 4 and 5, the rotation direction of the first rotary electric machine MG1 (first ring gear R1) is initially negative, but becomes positive after a time t1 as shown in FIG. 5. Since the rotation speed of the internal combustion engine EG is kept constant, the rotation speed of the first carrier C1 increases as the rotation speed of the first rotary electric machine MG1 (first ring gear R1) increases. As shown in FIG. 7, the eTC mode is continued until the rotation speed of the first carrier C1 becomes equal to or more than a specified rotation speed (#1, #10). The specified rotation speed is set to a value smaller than the rotation speed of the first sun gear S1 (internal combustion engine EG) serving as the first distribution rotation element Es1 (first rotation element) by a predetermined synchronization threshold.

As shown in FIG. 6, at time t2, when the rotation speed of the first carrier C1 becomes equal to or more than the specified rotation speed (when the rotation speed difference between the rotation speed of the first carrier C1 and the rotation speed of the first sun gear S1 becomes equal to or more than the synchronization threshold), the control device 10 controls the first rotary electric machine MG1 by the rotation speed control instead of the torque control (FIG. 7: #2). In other words, the synchronization maintaining control of maintaining the rotation speed difference to be equal to or less than the synchronization threshold is executed.

During execution of this synchronization maintaining control, the control device 10 performs the rotation speed control of the first rotary electric machine MG1 so that the first rotary electric machine MG1 has a specified difference rotation that is set to be equal to or less than the synchronization threshold. By controlling the first rotary electric machine MG1 so as not to exceed the rotation speed of the first sun gear S1 (internal combustion engine EG), the second engagement device CL2 can be smoothly engaged in the engagement control executed while the synchronization maintaining control is being executed.

In a case in which the second engagement device CL2 is a dog clutch as in the present embodiment, when the rotation speed of the first carrier C1 and the rotation speed of the first ring gear R1 are completely matched, a chamfer of a dog sleeve and dog teeth of the gear may not be able to be engaged. Thus, it is preferable to provide a difference between the rotation speed of the first carrier C1 and the rotation speed of the first ring gear R1. At this time, either the rotation speed of the first carrier C1 or the rotation speed of the first ring gear R1 may be lowered. However, in a case in which the vehicle is accelerating, when the rotation speed of the first ring gear R1 (the rotation speed of the first rotary electric machine MG1) becomes higher than that of the first carrier C1, an engagement shock in the acceleration direction is likely to occur at the time of engagement. Thus, when the second engagement device CL2 is engaged while the vehicle is accelerated ID from the eTC mode to the first HV mode, it is preferable that the synchronization threshold is set so that the rotation speed of the first ring gear R1 (the rotation speed of the first rotary electric machine MG1) becomes lower than the rotation speed of the first carrier C1.

Further, the second engagement device CL2 is not limited to a meshing engagement device as in the present embodiment, and may be configured by a friction engagement device. In the friction engagement device, since the transfer torque capacity can be controlled by setting the friction engagement device in the sliding engagement state, it is rare that ratcheting at the time of engagement as in the mesh type engagement device occurs, and it is easy to perform engagement relatively smoothly. However, even when the second engagement device CL2 is a frictional engagement device, by performing control so that the rotation speed of the first ring gear R1 and the rotation speed of the first carrier C1 have the rotation speed difference as described above, it is possible to transition more smoothly from the released state to the engagement state.

During execution of this rotation speed control, unlike the eTC mode, the rotation speed of the internal combustion engine EG increases with the rotation change of the distribution differential gear mechanism SP (rotation change of the first sun gear S1, first carrier C1, and first ring gear R1). That is, the driving force (vehicle system torque) decreases due to the inertia torque fluctuation as indicated by a dashed line in FIG. 6. In the present embodiment, for example, this decrease in the vehicle system torque can be compensated by the torque of the second rotary electric machine MG2, as shown in FIG. 6.

As described above, in the present embodiment, the second rotary electric machine MG2 is provided in addition to the first rotary electric machine MG1. The second rotary electric machine MG2 of the present embodiment is a rotary electric machine drivingly connected to the second wheels W2, which are wheels different from the first wheels W1, without interposing the first output member O1. This second rotary electric machine MG2 outputs a torque so as to compensate for the torque corresponding to the inertia of the internal combustion engine EG that is in accordance with the change in the rotation speed of the internal combustion engine EG due to the start of synchronization maintaining control. As a result, the driving force of the vehicle that decreases due to the execution of the synchronization maintaining control is compensated for, and it is possible to maintain stable traveling of the vehicle.

As shown in FIG. 7, following the execution of the rotation speed control of the first rotary electric machine MG1 (#2), an inertia torque compensation control is executed by the second rotary electric machine MG2 (#3). As a result, as shown in FIG. 6, the torque (compensation torque) by the second rotary electric machine MG2 is output from time t2, and the vehicle system torque is maintained as indicated by a solid line.

The form may be such that the second rotary electric machine MG2 is drive-coupled to the first output member O1 without being interposed by the transmission mechanism T (transmission TM). Further, the configuration may be such that the compensation torque is output by the internal combustion engine EG instead of by the second rotary electric machine MG2, and the vehicle system torque is maintained.

After the synchronization maintaining control is started at time t2, the rotation speed control of the first rotary electric machine MG1 is continued until a specified period T1 elapses (#4, #12 in FIG. 7). That is, the control device 10 starts the engagement control after the state in which the rotation speed difference is equal to or lower than the synchronization threshold continues for the predetermined period of specified period T1. At time t4 after the specified period T1 has elapsed, the engagement control of the second engagement device CL2 is started. In the present embodiment, the second engagement device CL2 is a mesh type engagement device, and as shown in FIG. 6, the stroke of the sleeve of the mesh type engagement device starts at time t4 (FIG. 7: #5). This specified period T1 is set to a time at which the control is converged so that the rotation speed of the first rotary electric machine MG1 can be stably controlled after the difference between the rotation speed of the first rotary electric machine MG1 and the target rotation speed first becomes equal to or less than the synchronization threshold value. By continuing the rotation speed control of the first rotary electric machine MG1 until the specified period T1 elapses, the rotation speed of the first rotary electric machine MG1 is stabilized, and the second engagement device CL2 can be smoothly engaged.

When a control convergence time can be narrowed down to within a certain range in advance by experiments, simulations, or the like, the control device 10 may start the engagement control after the synchronization maintaining control is started and the predetermined synchronization maintaining control duration time has elapsed.

When the engagement of the second engagement device CL2 is started at time t4 and the stroke amount exceeds a specified value at time t5, the control mode of the distribution differential gear mechanism SP transitions from the synchronization maintaining control to the direct connection transition control. The control device 10 ends the rotation speed control of the first rotary electric machine MG1, and controls the first rotary electric machine MG1 again by the torque control (#6, #7, #15 in FIG. 7). As described above, the second engagement device CL2 includes the dog sleeve (engagement drive member) that moves in conjunction with the state transition from the released state to the engagement state, and the second engagement device sensor Se14 (operation detection sensor) such as a sleeve position detection sensor and a hydraulic pressure detection sensor that detect an amount of movement of the dog sleeve. Based on the detection result of the second engagement device sensor Self, the control device 10 ends the synchronization maintaining control within a specified range with reference to the meshing start position of the dog sleeve (FIG. 6: time t5, FIG. 7: #6, #7, #15). This specified range is set in consideration of a movement error of the dog sleeve so that the synchronization maintaining control is ended before the chamfer formed in the dog sleeve is in contact with the dog teeth of the gear. After the synchronization maintaining control ends, the control device 10 transitions the control method of the first rotary electric machine MG1 to the torque control of outputting the torque in accordance with the target torque.

Even after the control method of the first rotary electric machine MG1 returns to the torque control, the movement of the dog sleeve continues until the second engagement device CL2 is completely engaged. When the dog sleeve completes moving to a predetermined position at time t6 shown in FIG. 6, the control mode of the distribution differential gear mechanism SP transitions from the direct connection transition control to the direct connection control. The second engagement device CL2 is in the full engagement state and the vehicle drive device 100 is driven by the first ITV mode (HV Lo) (FIG. 7: #8). Since the engagement of the second engagement device CL2 makes it possible to use all the torque of the internal combustion engine EG as the vehicle system torque, there is no need for the inertia compensation torque. At time t7, the inertia torque compensation control by the second rotary electric machine MG2 is ended.

As described above, by ending the synchronization maintaining control within the specified range in which the reference is the meshing start position of the dog sleeve, the control device 10 can smoothly perform drive control of the first rotary electric machine MG1 by the torque control after the second engagement device CL2 is in the engagement state and the first HV mode can be started.

The condition for the control device 10 to end the synchronization maintaining control is not limited to the specified range in which the reference is the meshing start position of the dog sleeve, and may be the elapsed time from the start of movement of the dog sleeve (stroke elapsed time T2).

SUMMARY OF THE EMBODIMENTS

Hereinafter, the summary of the control device (10) of the vehicle drive device described above will be briefly described.

As one aspect, a control device (10) of a vehicle drive device is a control device (10) of a vehicle drive device in which a control target is the vehicle drive device (100A (100)), the control device (10) including: an input member (I) that is drivingly connected to an internal combustion engine (EG); an output member (O1) that is drivingly connected to a wheel (W1); a rotary electric machine (MG1); a distribution differential gear mechanism (SP) including a first rotation element (Es1), a second rotation element (Es2), and a third rotation element (Es3), in which the first rotation element (Es1) is drivingly connected to the input member (I), and the third rotation element (Es3) is drivingly connected to a rotor (Ro1) of the rotary electric machine (MG1); a transmission mechanism (T) that performs power transmission between at least the second rotation element (Es2) and the output member (O2); a first engagement device (CL1) that is arranged in a power transmission path between the input member (I) and the first rotation element (Es1) and that connects and disconnects power transmission between the input member (I) and the first rotation element (Es1); and a second engagement device (CL2) that connects and disconnects power transmission between two selected from three rotation elements that are the first rotation element (Es1), the second rotation element (Es2), and the third rotation element (Es3), the control device (10) can execute a first mode in which the first engagement device (CL1) is in an engagement state and the second engagement device (CL2) is in a released state and torques of the internal combustion engine (EG) and the rotary electric machine (MG1) are transmitted to the output member (O1), and a second mode in which the first engagement device (CL1) and the second engagement device ((L2) are in the engagement state and the torques of the internal combustion engine (EG) and the rotary electric machine (MG1) are transmitted to the output member (O1), when transitioning from the first mode to the second mode in a state in which a rotation speed of the output member (O1) is being increased, while a rotation speed of the second rotation element (Es2) is lower than a rotation speed of the first rotation element (Es1), and a rotation speed difference between the rotation speed of the second rotation element (Es2) and the rotation speed of the first rotation element (Es1) is larger than a specified synchronization threshold, the control device (10) executes an asynchronization control in which the internal combustion engine (EG) is caused to output a target torque, and the rotary electric machine (MG1) is controlled so as to cause a rotation speed of the third rotation element (Es3) to follow the rotation speed of the first rotation element (Es1) and the rotation speed of the second rotation element (Es2), when the rotation speed difference between the rotation speed of the second rotation element (Es2) and the rotation speed of the first rotation element (Es1) becomes equal to or less than the synchronization threshold due to an increase in the rotation speed of the Output member (O1), the control device (10) executes a synchronization maintaining control of maintaining the rotation speed difference at a specified difference rotation that is set to be equal to or less than the synchronization threshold, by performing a rotation speed control of the rotary electric machine (MG1) in conjunction with the rotation speed of the second rotation element (Es2) and by causing the internal combustion engine (EG) to output the target torque, and the control device executes an engagement control of transitioning the second engagement device (CL2) from the released state to the engagement state while the synchronization maintaining control is being executed.

According to this configuration, when the rotation speed of the second rotation element (ES2) (the speed of the vehicle) is lower than the rotation speed of the first rotation element (Es1) (the rotation speed of the internal combustion engine), the vehicle can be appropriately accelerated in the first mode by causing the rotation speed of the third rotation element (ES3) (the rotation speed of the rotary electric machine) to follow the rotation speed of the first rotation element (ES1) and the rotation speed of the second rotation element (ES2). Further, after the speed of the vehicle is increased and the rotation speed difference between the rotation speed of the second rotation element (Es2) (the speed of the vehicle) and the rotation speed of the first rotation element (Es1) (the rotation speed of the internal combustion engine (EG)) becomes equal to or less than the specified synchronization threshold, the rotation speed difference between the three rotation elements of the distribution differential gear mechanism (SP) is maintained at a specified difference rotation that is set to be equal to or less than the synchronization threshold, by performing control of the rotation speed control of the internal combustion engine (EG) and the rotary electric machine (MG1) to match the rotation speed of the second rotation element (Es2) (synchronization maintaining control). Thus, it is possible maintain the rotation speed difference of the three rotation elements of the distribution differential gear mechanism (SP) to be small and it is possible to appropriately accelerate the vehicle. Since the engagement control of transitioning the second engagement device (CL2) from the released state to the engagement state is executed during execution of the synchronization maintaining control, the engagement operation of the second engagement device (CL2) can be performed smoothly. That is, according to this configuration, it is possible to smoothly engage the engagement device when transitioning the operation mode from the electric torque converter mode to the hybrid mode.

Here, it is preferable that the second engagement device be a meshing type engagement device.

In a meshing type engagement device, it is difficult to realize a sliding engagement state and control a transfer torque capacity as in a friction engagement device. However, by performing control as described above, even if the second engagement device (CL2) is a mesh type engagement device, the engagement device can be smoothly engaged when the operation mode is transitioned from the electric torque converter mode to the hybrid mode.

Further, it is preferable that the second engagement device (CL2) include an engagement drive member that moves in conjunction with a state transition from the released state to the engagement state, and an operation detection sensor (Se14) that detects a movement amount of the engagement drive member, the control device (10) end the synchronization maintaining control within a specified range in which a reference is a meshing start position of the engagement drive member based on a detection result of the operation detection sensor (Se14), and after the synchronization maintaining control ends, the control device (10) transition a control method of the rotary electric machine (MG1) to a torque control of outputting a torque in accordance with a target torque.

With this configuration, by ending the synchronization maintaining control within the specified range in which the reference is the meshing start position of the engagement drive member, the control device (10) can smoothly perform drive control of the rotary electric machine (MG1) by the torque control of the first engagement device (CL2) after the second engagement device (CL2) is in the engagement state.

Further, it is preferable that the engagement control be started after a state in which the rotation speed difference is equal to or less than the synchronization threshold continues for a specified period (T1) that is specified in advance.

With this configuration, by continuing the rotation speed control of the rotary electric machine (MG1) until the specified period (T1) elapses, the rotation speed of the rotary electric machine (MG1) is stabilized, and the second engagement device (CL)2 can be smoothly engaged.

Here, it is preferable that the rotary electric machine (MG1) be a first rotary electric machine (MG1), the vehicle drive device (100) include a second rotary electric machine (MG2) in addition to the first rotary electric machine (MG1), the second rotary electric machine (NG2) be a rotary electric machine that is drivingly connected to a wheel (W2) other than the wheel (W1) without the output member (O1) being interposed, or a rotary electric machine that is drivingly connected to the output member (O1) without the transmission mechanism (T) being interposed, and the second rotary electric machine (MG2) output a torque so as to compensate for a torque corresponding to an inertia of the internal combustion engine (EG) that is in accordance with a change in a rotation speed of the internal combustion engine (EG) due to a start of the synchronization maintaining control.

According to this configuration, the second rotary electric machine (MG2) outputs a torque so as to compensate for a torque corresponding to an inertia of the internal combustion engine (EG) that is in accordance with a change in a rotation speed of the internal combustion engine (EG) due to a start of the synchronization maintaining control. As a result, the driving force of the vehicle that decreases due to the execution of the synchronization maintaining control is compensated for, and it is possible to maintain stable traveling of the vehicle.

DESCRIPTION OF THE REFERENCE NUMERALS

10: control device,
100: vehicle drive device,
CL1: first engagement device,
CL2: second engagement device,
EG: internal combustion engine,
Es1: first distribution rotation element (first rotation element),
Es2: second distribution rotation element (second rotation element),
Es3: third distribution rotation element (third rotation element),
I: input member,
MG1: first rotary electric machine (rotary electric machine),
MG2: second rotary electric machine,
O1: first output member (output member),
Ro1: first rotor (rotor of first rotary electric machine),
Se14: second engagement device sensor (operation detection sensor),
SP: distribution differential gear mechanism,
T: transmission mechanism,
T1: specified period,
T2: stroke elapsed time,
W1: first wheel (wheel)

The invention claimed is:
1. A control device of a vehicle drive device in which a control target is the vehicle drive device, the control device comprising:
an input member drivingly connected to an internal combustion engine;
an output member drivingly connected to a wheel;
a rotary electric machine;
a distribution differential gear mechanism including a first rotation element, a second rotation element, and a third rotation element, in which the first rotation element is drivingly connected to the input member, and the third rotation element is drivingly connected to a rotor of the rotary electric machine;

a transmission mechanism that performs power transmission between at least the second rotation element and the output member;
a first engagement device that is arranged in a power transmission path between the input member and the first rotation element and that connects and disconnects power transmission between the input member and the first rotation element; and
a second engagement device that connects and disconnects power transmission between two selected from three rotation elements that are the first rotation element, the second rotation element, and the third rotation element, wherein
the control device can execute a first mode in which the first engagement device is in an engagement state, the second engagement device is in a released state, and torques of the internal combustion engine and the rotary electric machine are transmitted to the output member, and a second mode in which the first engagement device and the second engagement device are in the engagement state and the torques of the internal combustion engine and the rotary electric machine are transmitted to the output member,
when transitioning from the first mode to the second mode in a state in which a rotation speed of the output member is being increased,
while a rotation speed of the second rotation element is lower than a rotation speed of the first rotation element, and a rotation speed difference between the rotation speed of the second rotation element and the rotation speed of the first rotation element is larger than a specified synchronization threshold, the control device executes an asynchronization control in which the internal combustion engine is caused to output a target torque, and the rotary electric machine is controlled so as to cause a rotation speed of the third rotation element to follow the rotation speed of the first rotation element and the rotation speed of the second rotation element,
when the rotation speed difference between the rotation speed of the second rotation element and the rotation speed of the first rotation element becomes equal to or less than the synchronization threshold due to an increase in the rotation speed of the output member, the control device executes a synchronization maintaining control of maintaining the rotation speed difference at a specified difference rotation that is set to be equal to or less than the synchronization threshold, by performing a rotation speed control of the rotary electric machine in conjunction with the rotation speed of the second rotation element and by causing the internal combustion engine to output the target torque, and
the control device executes an engagement control of transitioning the second engagement device from the released state to the engagement state while the synchronization maintaining control is being executed.

2. The control device of a vehicle drive device according to claim 1, wherein the second engagement device is a mesh type engagement device.

3. The control device of a vehicle drive device according to claim 2, wherein
the second engagement device includes an engagement drive member that moves in conjunction with a state transition from the released state to the engagement state, and an operation detection sensor that detects a movement amount of the engagement drive member,
the control device ends the synchronization maintaining control within a specified range in which a reference is a meshing start position of the engagement drive member, based on a detection result of the operation detection sensor, and
after the synchronization maintaining control ends, the control device transitions a control method of the rotary electric machine to a torque control of outputting a torque in accordance with a target torque.

4. The control device of a vehicle drive device according to claim 1, wherein the engagement control is started after a state in which the rotation speed difference is equal to or less than the synchronization threshold continues for a specified period that is specified in advance.

5. The control device of a vehicle drive device according to claim 1, wherein
the rotary electric machine is a first rotary electric machine, and a second rotary electric machine is provided in addition to the first rotary electric machine,
the second rotary electric machine is a rotary electric machine that is drivingly connected to a wheel other than the wheel without the output member being interposed, or a rotary electric machine that is drivingly connected to the output member without the transmission mechanism being interposed, and
the second rotary electric machine outputs a torque so as to compensate for a torque corresponding to an inertia of the internal combustion engine that is in accordance with a change in a rotation speed of the internal combustion engine due to a start of the synchronization maintaining control.

6. The control device of a vehicle drive device according to claim 2, wherein the engagement control is started after a state in which the rotation speed difference is equal to or less than the synchronization threshold continues for a specified period that is specified in advance.

7. The control device of a vehicle drive device according to claim 3, wherein the engagement control is started after a state in which the rotation speed difference is equal to or less than the synchronization threshold continues for a specified period that is specified in advance.

8. The control device of a vehicle drive device according to claim 2, wherein
the rotary electric machine is a first rotary electric machine, and a second rotary electric machine is provided in addition to the first rotary electric machine,
the second rotary electric machine is a rotary electric machine that is drivingly connected to a wheel other than the wheel without the output member being interposed, or a rotary electric machine that is drivingly connected to the output member without the transmission mechanism being interposed, and
the second rotary electric machine outputs a torque so as to compensate for a torque corresponding to an inertia of the internal combustion engine that is in accordance with a change in a rotation speed of the internal combustion engine due to a start of the synchronization maintaining control.

9. The control device of a vehicle drive device according to claim 3, wherein
the rotary electric machine is a first rotary electric machine, and a second rotary electric machine is provided in addition to the first rotary electric machine,
the second rotary electric machine is a rotary electric machine that is drivingly connected to a wheel other than the wheel without the output member being interposed, or a rotary electric machine that is drivingly connected to the output member without the transmission mechanism being interposed, and the second rotary electric machine outputs a torque so as to compensate for a torque corresponding to an inertia of the internal combustion engine that is in accordance with a change in a rotation speed of the internal combustion engine due to a start of the synchronization maintaining control.

10. The control device of a vehicle drive device according to claim 4, wherein the rotary electric machine is a first rotary electric machine, and a second rotary electric machine is provided in addition to the first rotary electric machine, the second rotary electric machine is a rotary electric machine that is drivingly connected to a wheel other than the wheel without the output member being interposed, or a rotary electric machine that is drivingly connected to the output member without the transmission mechanism being interposed, and the second rotary electric machine outputs a torque so as to compensate for a torque corresponding to an inertia of the internal combustion engine that is in accordance with a change in a rotation speed of the internal combustion engine due to a start of the synchronization maintaining control.

11. The control device of a vehicle drive device according to claim 6, wherein the rotary electric machine is a first rotary electric machine, and a second rotary electric machine is provided in addition to the first rotary electric machine, the second rotary electric machine is a rotary electric machine that is drivingly connected to a wheel other than the wheel without the output member being interposed, or a rotary electric machine that is drivingly connected to the output member without the transmission mechanism being interposed, and the second rotary electric machine outputs a torque so as to compensate for a torque corresponding to an inertia of the internal combustion engine that is in accordance with a change in a rotation speed of the internal combustion engine due to a start of the synchronization maintaining control.

12. The control device of a vehicle drive device according to claim 7, wherein the rotary electric machine is a first rotary electric machine, and a second rotary electric machine is provided in addition to the first rotary electric machine, the second rotary electric machine is a rotary electric machine that is drivingly connected to a wheel other than the wheel without the output member being interposed, or a rotary electric machine that is drivingly connected to the output member without the transmission mechanism being interposed, and the second rotary electric machine outputs a torque so as to compensate for a torque corresponding to an inertia of the internal combustion engine that is in accordance with a change in a rotation speed of the internal combustion engine due to a start of the synchronization maintaining control.

\* \* \* \* \*